US009061647B2

(12) United States Patent
Steinbrecher

(10) Patent No.: US 9,061,647 B2
(45) Date of Patent: Jun. 23, 2015

(54) TRIM ASSEMBLY AND COMPONENT WITH RETENTION FEATURE

(71) Applicant: Toyota Motor Engineering & Manufacturing North America, Inc., Erlanger, KY (US)

(72) Inventor: Robert C. Steinbrecher, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 52 days.

(21) Appl. No.: 14/088,835

(22) Filed: Nov. 25, 2013

(65) Prior Publication Data

US 2015/0145233 A1 May 28, 2015

(51) Int. Cl.
*B60R 21/16* (2006.01)
*B60R 21/215* (2011.01)

(52) U.S. Cl.
CPC .................................... *B60R 21/215* (2013.01)

(58) Field of Classification Search
USPC ................. 280/728.2, 728.3, 730.2
See application file for complete search history.

(56) References Cited

U.S. PATENT DOCUMENTS

| | | | |
|---|---|---|---|
| 5,465,200 A | 11/1995 | Finocchio et al. | |
| 6,145,870 A * | 11/2000 | Devane et al. | 280/728.2 |
| 6,357,901 B1 | 3/2002 | Grossman et al. | |
| 7,607,807 B2 | 10/2009 | Hall | |
| 7,758,066 B2 * | 7/2010 | Sia et al. | 280/728.2 |
| 7,762,574 B1 | 7/2010 | Spamer et al. | |
| 8,366,303 B2 | 2/2013 | Ludwig et al. | |
| 8,387,257 B2 | 3/2013 | Salter et al. | |
| 2003/0205887 A1* | 11/2003 | Wallner et al. | 280/730.2 |
| 2004/0227334 A1* | 11/2004 | Chausset | 280/730.2 |
| 2005/0052005 A1* | 3/2005 | Lunt et al. | 280/730.2 |
| 2005/0062267 A1* | 3/2005 | Recker et al. | 280/730.2 |
| 2005/0225060 A1* | 10/2005 | Wold | 280/728.2 |
| 2007/0080524 A1* | 4/2007 | Kim | 280/730.2 |
| 2007/0108742 A1* | 5/2007 | Itakura | 280/728.3 |
| 2007/0241542 A1* | 10/2007 | Wallace | 280/728.2 |
| 2008/0197609 A1* | 8/2008 | Jaramillo et al. | 280/730.2 |

* cited by examiner

*Primary Examiner* — Toan To
(74) *Attorney, Agent, or Firm* — Dinsmore & Shohl LLP

(57) ABSTRACT

A trim assembly covering an airbag in a vehicle. The trim assembly includes a trim panel having an A-side surface and a C-side surface opposite of the A-side surface. Portions of the trim panel define an aperture through which a trim component is mounted, including a bezel and a backplate, with the bezel engaging the A-side surface of the trim panel, generally about the aperture. A backplate of the trim component includes a central portion and a flange extending from the central portion in surface-to-surface engagement with the C-side surface of the trim panel. The flange includes a plurality of projections formed on its surface so as to penetrate into the trim panel through the C-side surface. During activation of the airbag, the trim panel is displaced to permit deployment of the airbag, and the projections operate to retain the trim component in engagement with the trim panel.

20 Claims, 5 Drawing Sheets

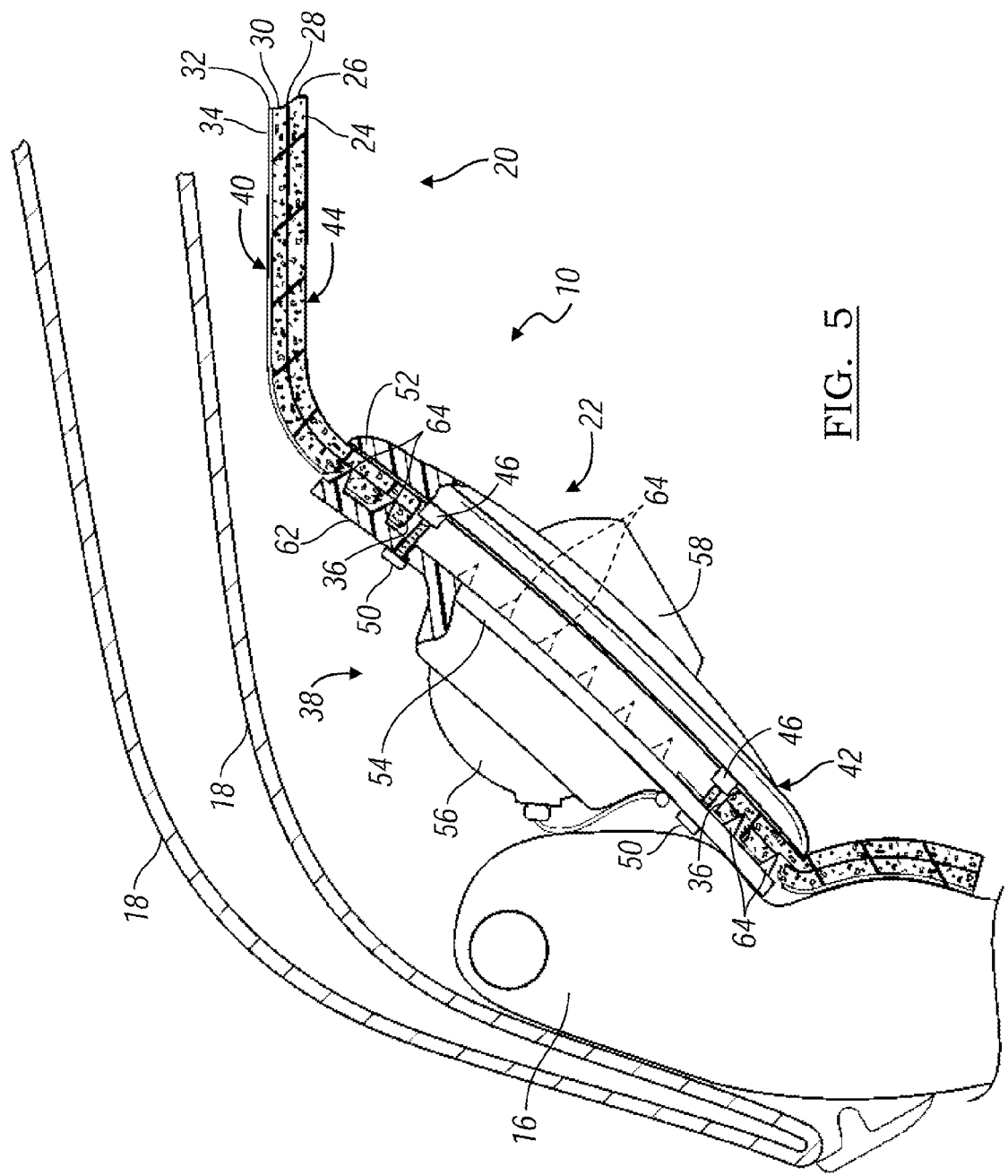

TRIM ASSEMBLY AND COMPONENT WITH RETENTION FEATURE

BACKGROUND

1. Field of the Invention

The present invention generally relates to a trim assembly for a vehicle. More specifically, the invention relates to a trim assembly that is incorporated into an area of the vehicle where an airbag is retained, and where the trim assembly is provided with trim components that are securely retained with the trim assembly during deployment of the airbag.

2. Description of Related Art

It is well known to mount trim components to trim panels that are utilized to define the interior surfaces of the occupant compartment of a vehicle. Such trim components may include, without limitation, reading and map lights, mirrors, HVAC vents, garment hooks, and grab handles. Generally, the trim component is mounted through an aperture or opening formed in the trim panel. Depending on the weight and function of the trim component, the trim component may solely be mounted to the trim panel or may be further mounted to a body structure of the vehicle.

Many vehicles now incorporate airbags that are mounted behind various portions of interior trim. For example, side airbags may be mounted behind the interior trim piece covering the B-pillar of the vehicle. A side curtain airbag may be mounted along the roof side rail and extend substantially the length of the occupant compartment of the vehicle. During deployment of these airbags, the trim piece covering the airbag is designed so that it provides an opening through which the airbag may be deployed. The force generated by the deploying airbag is significant since the airbag must not only fully inflate before being impacted by an occupant of the vehicle, but must also manipulate the trim piece to fracture or dislodge it from its installed position. The trim piece, however, must react in such a way that it is not projected into the occupant compartment. To achieve this, portions of the trim piece may be securely mounted to the body structure of the vehicle.

In some installations, a trim component (attached to the trim panel) may be located in a position where it moves with the trim panel during the deployment of the airbag. More specifically, the trim component may in fact be impacted by the deploying airbag as the trim panel is manipulated. If the force of impact is sufficient enough, the trim component may be dislodged from the trim panel itself. Since the trim component is mounted within an aperture in the trim panel, if the trim component is dislodged, the trim component may be projected into the occupant compartment of the vehicle.

Various solutions have been proposed to reduce the possibility that the trim component will be dislodged from the trim panel and projected into the occupant compartment of the vehicle. In one solution, the trim component is separately tethered to a body structure of the vehicle. In another solution, additional retaining structures are integrated into the trim panel to further secure the trim component. In still another solution, portions of the trim component are made overly large so as to inhibit the ability of the trim component to be forced through the aperture in the trim panel.

With each of the above solutions, additional problems arise. For example, in certain installations it is not feasible to secure the trim component to a body structure of the vehicle; additional retention structures increase the complexity and cost of installation; and overly large components may be restricted because of packaging constraints and added weight to the component.

SUMMARY

In satisfying the above need, as well as overcoming the enumerated drawbacks and other limitations of the related art, the present invention provides a trim assembly for covering an airbag in a vehicle, the trim assembly having a trim panel with an A-side surface oriented toward an occupant compartment of the vehicle and a C-side surface opposite of the A-side surface, portions of the trim panel defining an aperture through the trim panel from the A-side surface to the C-side surface, the trim panel being mounted to the vehicle and covering the airbag; a trim component mounted to the trim panel and extending through an aperture, the trim component including a bezel and a backplate, the bezel engaging the A-side surface of the trim panel generally about the aperture, the backplate including a central portion and also including a flange extending from the central portion in surface-to-surface engagement with the C-side surface of the trim panel, the flange having a plurality of projections formed on a surface thereof and penetrating into the trim panel through the C-side surface; and during activation of the airbag, the trim panel is configured to be displaced permitting deployment of the airbag past the trim panel with the trim component being retained in engagement with the trim panel.

In another aspect of the invention, the trim assembly includes a flange that extends around the central portion.

In a further aspect of the invention, the flange extends fully around the central portion and is in engagement with the C-side surface around the aperture.

In yet another aspect of the invention, projections are provided circumferentially on the flange.

In an additional aspect of the invention, the projections generally encircle the central portion.

In another aspect of the invention, the projections are cone shape or conical.

In an additional aspect of the invention, the projections terminate in a point.

In another aspect of the invention, the C-side surface of the trim panel is formed of a scrim material.

In still another aspect of the invention, the scrim material includes glass fibers.

In yet another aspect of the invention, the trim panel includes a layer formed of a scrim material.

In a further aspect of the invention, the projections penetrate the scrim material.

In another aspect of the invention, the trim assembly includes a trim panel having an A-side surface and a C-side surface opposite of the A-side surface, portions of the trim panel defining an aperture extending through the trim panel from the A-side surface to the C-side surface; a trim component mounted to the trim panel and covering the aperture, the trim component including a backplate engaging the C-side surface of the trim panel, the backplate having a central portion and a peripheral flange extending from the central portion in surface-to-surface engagement with the C-side surface of the trim panel, a plurality of projections formed on a surface of the flange and penetrating into the trim panel through the C-side surface; and the projections retain the trim component in engagement with the trim panel and covering the aperture during application of a force to the trim component that urges the trim component through the aperture.

In still another aspect of the invention, the flange extends around at least a portion of the central portion.

In another aspect of the invention, the flange fully encircles the aperture.

In yet another aspect of the invention, the trim panel includes a layer of scrim material and the projections penetrate into the scrim layer.

In an additional aspect of the invention, the scrim material includes glass fibers and the projections penetrate between the glass fibers.

In another aspect of the invention, the projections fully encircle the aperture.

In still a further aspect of the invention, the projections are in the shape of a cone or are conical in shape.

In an additional aspect of the invention, the trim component is a light subassembly.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 5 is a cross-sectional view of the trim assembly, similar to that seen in FIG. 4, just after initial deployment of the airbag.

DETAILED DESCRIPTION

Figure 1:
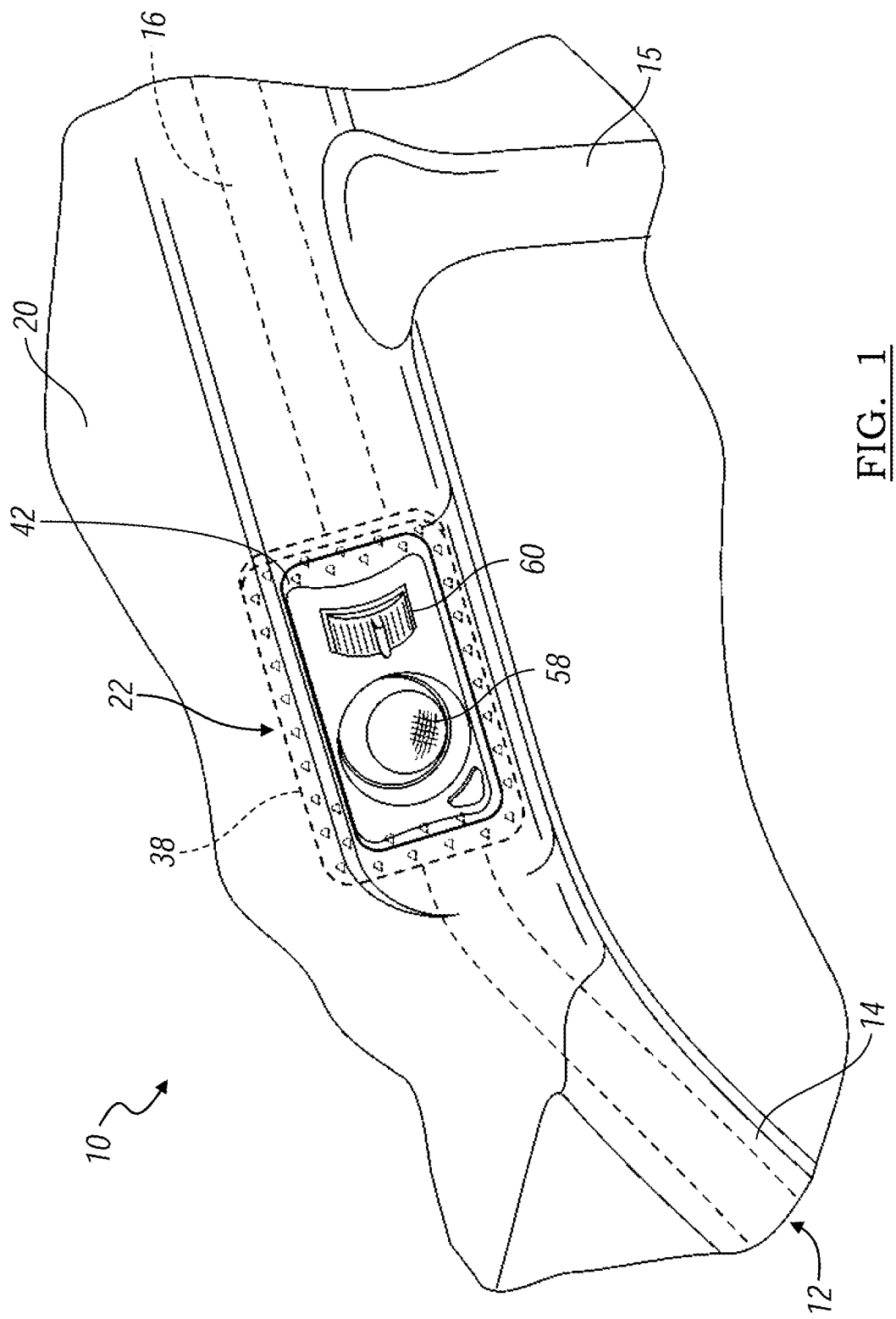
FIG. 1 illustrates a trim assembly mounted to the body structure of a vehicle and embodying the principles of the present invention.

Referring now to the drawings, a trim assembly embodying the principles of the present invention is illustrated therein and designated at 10. The trim assembly 10 is mounted within a vehicle 12 such that the trim assembly defines an interior surface of the vehicle's passenger compartment. As depicted in FIG. 1, the trim assembly 10 is embodied as a headliner and is seen as covering the roof of the vehicle, both adjacent to and forward of the C-pillar 14 of the vehicle 12. (The forward direction is toward the right in FIG. 1.)

Automotive vehicles of today often include airbags installed throughout the passenger compartment of the vehicle. These airbags are hidden from view by various trim pieces or assemblies that overlie the airbags. When an airbag is activated, the associated trim piece is designed to yield in some manner and allow the airbag to deploy through or past the trim piece.

One particular type of airbag is the side airbag. A side airbag may be mounted in a number of locations, including along the side of a seat, along the vertically oriented A-, B- or C-pillars (the various pillars are located between the windows of the vehicle and are designated A-B-C proceeding from the front of the vehicle toward the rear) or along the longitudinally oriented roof side rail located above the various pillars. In the latter instance, the airbag may be a curtain side airbag that extends substantially the full length of the vehicle's passenger compartment.

Figure 4:
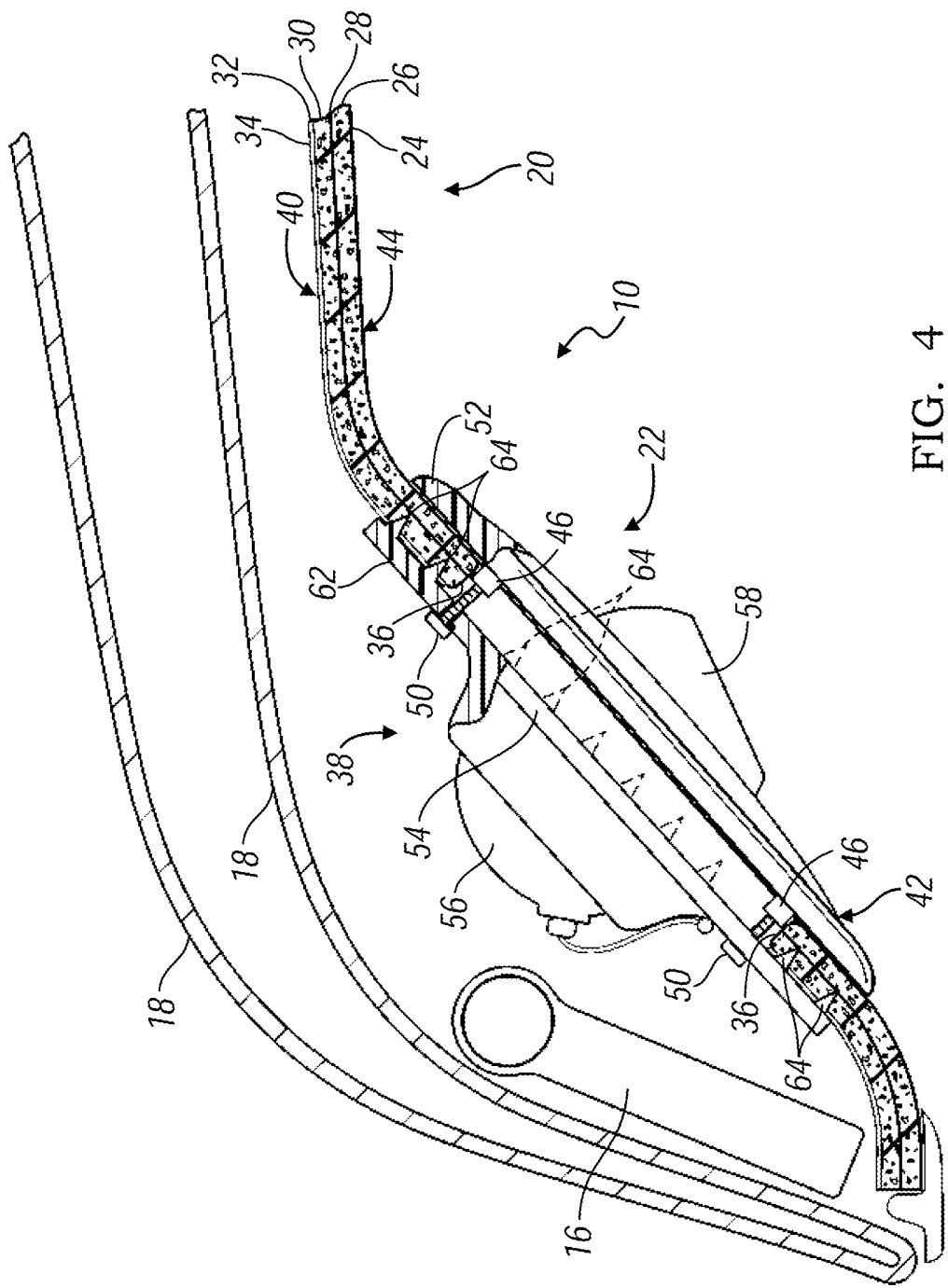
FIG. 4 is a cross-sectional view of the trim assembly mounted to the body structure of the vehicle, as seen in FIG. 1.

As with other airbags, trim pieces or assemblies are used to hide or cover side airbags and, in particular, curtain side airbags. As seen in FIG. 1, the trim assembly 10 covers a curtain side airbag 16 that is installed longitudinally along the roof side rail 18 (see FIG. 4) and passenger compartment of the vehicle 12. While described particularly in connection with a curtain side airbag 16, it will be appreciated that the trim assembly 10 of the present invention has applicability beyond the specifically described embodiment. For example, the principles of the invention could be employed in a trim assembly covering an airbag that is positioned in the B-pillar 15 or elsewhere in the vehicle. Additionally, the principles of the present invention could also be employed in a trim assembly that does not overlie an airbag.

As its primary components, a trim assembly 10 embodying the principles of the present invention includes a trim panel 20 and a trim component 22.

The trim panel 20 is formed of a material having sufficient strength to provide rigidity and structure to the trim assembly 10 and to support the weight of the trim component 22 when installed thereto. Additionally, the trim panel 20 is sufficiently flexible so as to deflect and permit the curtain side airbag 16 to be deployed past the deflected trim panel. While the trim panel 20 may be formed of any material known or used in the art for making such trim panels, in a preferred embodiment the trim panel 20 has a multilayer construction. The show or visible side, also known as the A-side, is formed of a fabric material 24 that complements the interior finish of the passenger compartment. The fabric 24 is secured to a first foam backing 26 of relatively low density or firmness. The low density of the foam backing 26 allows the trim panel 20 to exhibit softness upon being touched. The foam backing 26 is secured by a layer of adhesive 28 to a second foam backing 30. The second foam backing 30 is denser and more firm than the first foam backing 26 and provides the trim panel 20 with some of its rigidity. Secured to the second foam backing 30, by another adhesive layer 32 or other securing means, is a scrim material 34. The scrim material 34 is preferably a material that is reinforced by the inclusion of glass fibers or other strands. The fibers or strands may be randomly oriented or set within the material with a specific orientation. Alternatively, the scrim material 34 may include a woven or non-woven mesh as its reinforcing component.

The trim component 22 itself may be any one of the variety of known components that are incorporated into vehicles. As such, the trim component 22 may be in the form of a light assembly, a garment hook, or other component. As discussed herein, the trim component 22 is in the form of a light assembly, but it will be appreciated that the invention is not limited to such construction.

As previously noted, the trim component 22 is mounted to and supported by the trim panel 20. To facilitate this mounting, portions of the trim panel 20 define an aperture 36 over which the trim component 22 is mounted and through which portions of the trim component 22 extend. To achieve this, a backplate 38 is positioned on the hidden or C-side 40 of the trim panel 20, while a bezel 42 is positioned on the show or A-side 44 of the trim panel 20.

The bezel 42 may include bosses 46 or similar structure that extends through the aperture 36 so as to engage or contact the backplate 38. In locations corresponding to the bosses 46, the backplate 38 is provided with bores 48 through which fasteners 50 are extended to engage the bosses 46 and retain the bezel 42 with the backplate 38. The bezel 42 further includes a frame portion 52 that circumferentially covers the perimeter of the aperture 36 when viewed from the interior of the vehicle's passenger compartment and toward the A-side 44. Thus, the perimeter of the aperture 36 is covered and hidden from view by the bezel 42.

The backplate 38 includes a central portion 54 that has one or more housing elements 56 which receive a subassembly of the trim component 22. For example, one housing element 56 may receive and secure a lamp subassembly 58, while another housing element 56 may receive and secure a switch subassembly 60, the latter being operably connected to the lamp sub assembly 58.

Opposite of at least part of the frame portion 52 of the bezel 42, the backplate 38 includes a flange 62. The flange 62 extends from the central portion 56 so as to overlie at least some of those portions of the trim panel 20 immediately adjacent to the aperture 36. In one construction, the flange 62 is intermittently provided about the central portion 56. In another construction, the central portion 56 may be completely bounded or encircled by the flange 62 and, correspondingly, the perimeter of the aperture 36 may be completely circumscribed and covered by the flange 62 in surface-to surface engagement with the hidden side 40 of the trim panel 20.

As is apparent from the above description, the flange 62 cooperates with the frame portion 52 and clamps or compressively engages the trim panel 20 therebetween, which in turn secures the trim component 22 to the trim panel 20. While the above described engagement is sufficient to secure the trim component 22 to the trim panel 20 during normal operation of the vehicle, the present invention employs additional features to ensure that the trim component 22 remains engaged with the trim panel 20, and is not propelled through the aperture 36 and into the occupant compartment during the application of a force in that direction, such as during deployment of the airbag 16.

Figure 2:
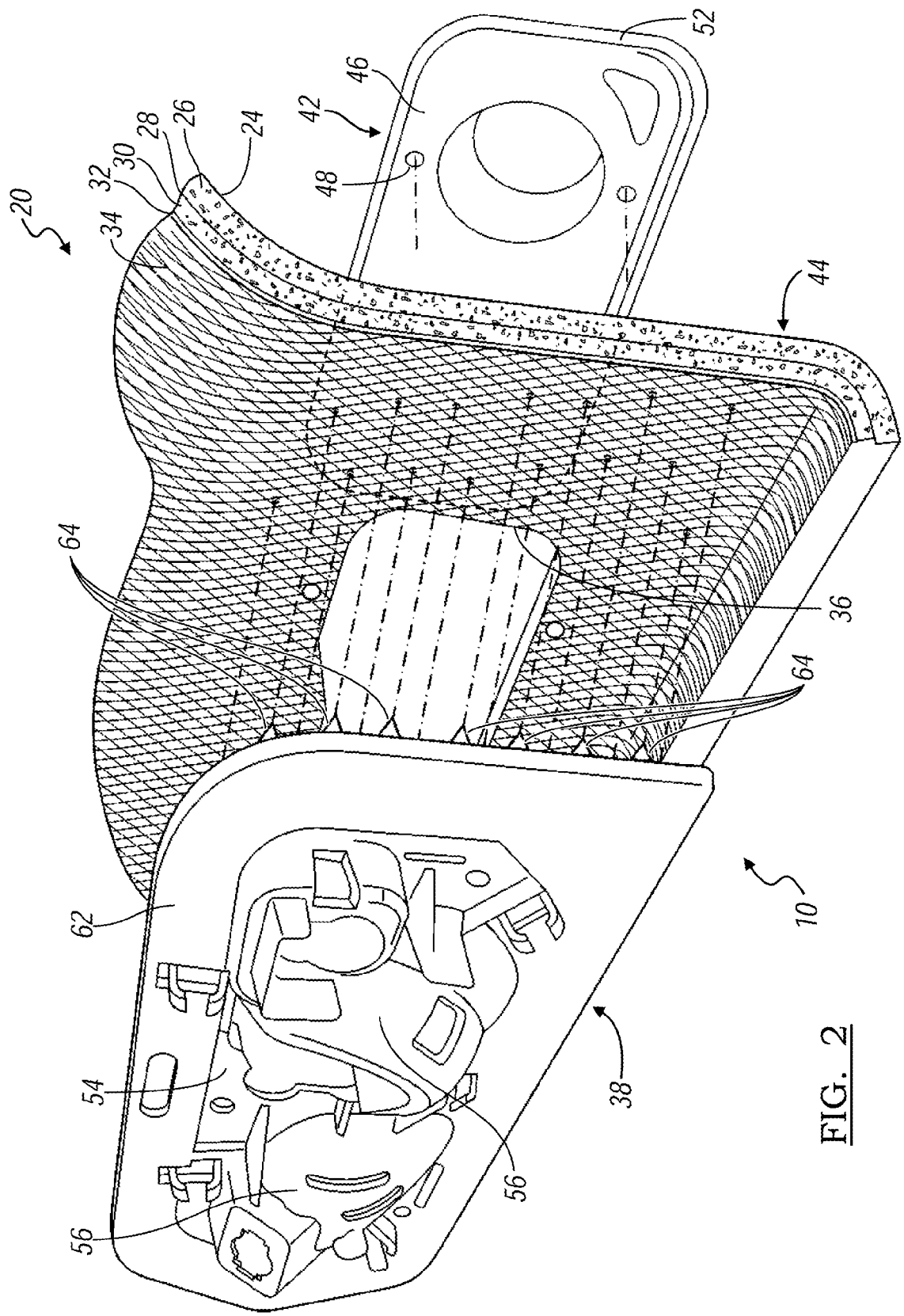
FIG. 2 is an exploded view of the trim assembly seen in FIG. 1.
Figure 3:
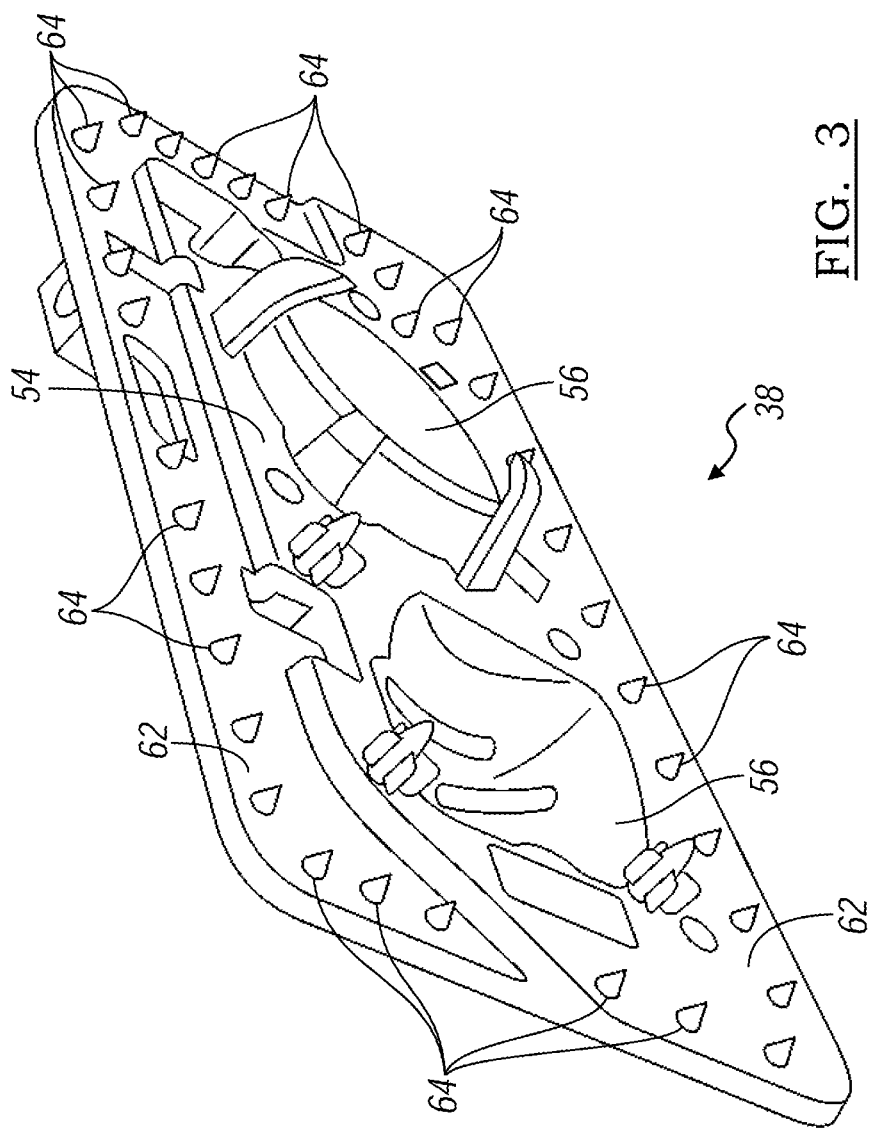
FIG. 3 is a view of the engagement side of the backplate of the trim component, which is seen in FIG. 2 from the non-engaging side.

To achieve the above, the backplate 38 is provided with a series of projections, spikes or teeth 64, which are seen in FIG. 2 and hereafter just simply referred to as "teeth." The teeth 64 extend from the surface of the flange 62 in the direction of the trim panel 20 and may be provided in localized areas of the flange 62 or over the full extent of the flange 62. In the latter instance, the teeth 64 may themselves fully encircle or circumscribe the central portion 54 of the backplate 38 and may be provided in a single or multi-row layout. While the teeth 64 are preferably conical or in the shape of a cone to facilitate penetration into the trim panel 20, other shapes may be employed, so long as they provide sufficient retention benefits, as described herein.

The backplate 38 is secured to the bezel 42 by the fasteners 50 or by engagement between corresponding portions of the bezel 42 and the backplate 38. As the flange 62 is drawn towards the trim panel 20 during this engagement, the teeth 64 penetrate the surface of the C-side 40 and extend into the trim panel 20 to a depth generally corresponding with the height of the teeth 64. Preferably, the teeth 64 do not penetrate to such an extent that they protrude out of the A-side 44 of the trim panel 20. Depending on the width of the flange 62, the teeth 64 may be directly opposed by the frame portion 52 of the bezel 42 or they may be located in an outward position beyond the edge of the frame portion 52. If they are directly opposed by the frame portion 52, the teeth 64 may protrude through the A-side 44 since they will be hidden from view by the frame portion 52. Additional retention capabilities of the trim component 22 with the trim panel 20 are afforded to the trim assembly 10 by virtue of the teeth 64 penetrating into the trim panel 21.

Because the teeth 64 penetrate into the trim panel 20, in order to force the trim component 22 through the aperture 36 during the deployment of the airbag 16, an additional force is required over that required when the trim component 22 merely clamps opposing sides of the trim panel 20. With the present construction, in order for the trim component 22 to be projected through the aperture 36, the tear strength of the trim panel 20 must be overcome. With the inclusion of the scrim material 34 in the trim panel 20, and more particularly with the glass fibers or mesh of the scrim material 34, the tear strength of the trim panel 20 is increased, as is the retention capability of the trim component 22 therewith. This is because the glass fibers or mesh of the scrim material 34 not only strengthen the trim panel 20, but interlock with the penetrating teeth 64. Thus, both the frictional engagement caused by the clamping forces of the trim component 22 on the trim panel 20 and the tear strength of trim panel 20 must be overcome in order to dislodge the trim component 22 from the aperture 36.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

I claim:

1. A trim assembly for covering an airbag in a vehicle, the trim assembly comprising:
    a trim panel having an A-side surface oriented toward an occupant compartment of the vehicle and having a C-side surface opposite of the A-side surface, portions of the trim panel defining an aperture through the trim panel from the A-side surface to the C-side surface, the trim panel being mounted to the vehicle and covering the airbag;
    a trim component mounted to the trim panel and extending through an aperture, the trim component including a bezel and a backplate, the bezel engaging the A-side surface of the trim panel generally about the aperture, the backplate including a central portion and also including a flange extending from the central portion in surface-to-surface engagement with the C-side surface of the trim panel, the flange having a plurality of projections formed on a surface thereof and penetrating into the trim panel through the C-side surface; and
    whereby during activation of the airbag, the trim panel is configured to be displaced permitting deployment of the airbag past the trim panel with the trim component being retained in engagement with the trim panel.

2. The trim assembly according to claim 1, wherein the flange extends around the central portion.

3. The trim assembly according to claim 1, wherein the flange extends fully around the central portion and is in engagement with the C-side surface around the aperture.

4. The trim assembly according to claim 1, wherein the projections are provided circumferentially on the flange.

5. The trim assembly according to claim 1, wherein the projections generally encircle the central portion.

6. The trim assembly according to claim 1, wherein the projections are in the shape of a cone.

7. The trim assembly according to claim 1, wherein the projections are conical.

8. The trim assembly according to claim 1, wherein the projections terminate in a point.

9. The trim assembly according to claim 1, wherein the C-side surface of the trim panel is formed of a scrim material.

10. The trim assembly according to claim 9, wherein the scrim material includes glass fibers.

11. The trim assembly according to claim 1, wherein the trim panel includes a layer formed of a scrim material.

12. The trim assembly according to claim 11, wherein the projections penetrate the scrim material.

13. A trim assembly for an automotive vehicle, the trim assembly comprising:
- a trim panel having an A-side surface and a C-side surface opposite of the A-side surface, portions of the trim panel defining an aperture extending through the trim panel from the A-side surface to the C-side surface;
- a trim component mounted to the trim panel and covering the aperture, the trim component including a backplate engaging the C-side surface of the trim panel, the backplate having a central portion and a peripheral flange extending from the central portion in surface-to-surface engagement with the C-side surface of the trim panel, a plurality of projections formed on a surface of the flange and penetrating into the trim panel through the C-side surface; and
- whereby the projections retain the trim component in engagement with the trim panel and covering the aperture during application of a force to the trim component that urges the trim component through the aperture.

14. The trim assembly of claim 13, wherein the flange extends around at least a portion of the central portion.

15. The trim assembly of claim 13, wherein the flange fully encircles the aperture.

16. The trim assembly of claim 13, wherein the trim panel includes a layer of scrim material and the projections penetrate into the scrim layer.

17. The trim assembly of claim 16, wherein the scrim material includes glass fibers and the projections penetrate between the glass fibers.

18. The trim assembly of claim 13, wherein the projections fully encircle the aperture.

19. The trim assembly of claim 13, wherein the projections are conical in shape.

20. The trim assembly of claim 13, wherein the trim component is a light subassembly.

* * * * *